United States Patent
Andandan et al.

(10) Patent No.: US 10,965,944 B2
(45) Date of Patent: Mar. 30, 2021

(54) DYNAMIC BANDWIDTH VOTING

(71) Applicant: QUALCOMM Incorporated, San Diego, CA (US)

(72) Inventors: Gopikrishnaiah Andandan, San Diego, CA (US); Dhaval Kanubhai Patel, San Diego, CA (US); Dileep Marchya, Hyderabad (IN); Nagamalleswararao Ganji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/458,647

(22) Filed: Jul. 1, 2019

(65) Prior Publication Data
US 2021/0006801 A1    Jan. 7, 2021

(51) Int. Cl.
| G06F 13/14 | (2006.01) |
| H04N 19/164 | (2014.01) |
| G09G 5/00 | (2006.01) |
| H04N 19/174 | (2014.01) |
| H04N 19/42 | (2014.01) |

(52) U.S. Cl.
CPC ........... *H04N 19/164* (2014.11); *G09G 5/006* (2013.01); *H04N 19/174* (2014.11); *H04N 19/42* (2014.11); *G09G 2350/00* (2013.01)

(58) Field of Classification Search
None
See application file for complete search history.

(56) References Cited

U.S. PATENT DOCUMENTS

| 2009/0245637 | A1* | 10/2009 | Barman | G06K 9/3233 |
| | | | | 382/173 |
| 2014/0368738 | A1* | 12/2014 | Hoffert | H04N 21/42222 |
| | | | | 348/564 |
| 2017/0083262 | A1* | 3/2017 | Gadelrab | G06F 3/0661 |
| 2017/0091575 | A1* | 3/2017 | Lee | G06K 9/481 |
| 2017/0228252 | A1* | 8/2017 | Gadelrab | G06F 9/467 |
| 2018/0041612 | A1* | 2/2018 | Chen | H04N 19/426 |
| 2018/0048943 | A1* | 2/2018 | Melkote | H04N 21/440281 |
| 2018/0089091 | A1* | 3/2018 | Akenine-Moller | G06T 1/60 |
| 2018/0160160 | A1* | 6/2018 | Swaminathan | H04N 21/8456 |
| 2018/0191993 | A1* | 7/2018 | Gera | H04N 5/232411 |

* cited by examiner

*Primary Examiner* — Anh-Tuan V Nguyen
(74) *Attorney, Agent, or Firm* — Patterson & Sheridan, L.L.P

(57) ABSTRACT

In some aspects, the present disclosure provides a method for bandgap voting. In some configurations, the method includes receiving, at a hardware voting component associated with a destination subsystem, metadata for each of a plurality of compressed display tiles, wherein for each of the plurality of compressed display tiles the metadata indicates an amount of compression of the compressed display tile. In some configurations, the method includes dividing the plurality of compressed display tiles into a plurality of sets of compressed display tiles. In some configurations, for each of the plurality of sets of compressed display tiles, the method includes determining a desired bandwidth for communicating the set of compressed display tiles over a bus, and receiving the set of compressed display tiles at the destination subsystem over the bus at an actual bandwidth that is based on the desired bandwidth.

14 Claims, 4 Drawing Sheets

DYNAMIC BANDWIDTH VOTING

BACKGROUND

Field of the Disclosure

The teachings of the present disclosure relate generally to controlling bus bandwidth.

Description of Related Art

Computing devices are becoming more ubiquitous as the devices become more portable. As use of portable devices such as mobile phones, tablets, and laptop computers increases, so too does the functionality required of such devices. For example, while a cellular phone may have a primary function relating to voice and text communications, modern cellular phones may also include peripheral functions that require a display device for providing visual information to a user.

Many display devices are capable of providing high-resolution interfaces that are capable of accurately reproducing a wide color gamut. However, supporting the high resolution and color range of these display devices requires rapid and continuous communication of relatively large amounts of video or image data between subsystems of the computing device. For example, a display device with 4K resolution using RGB888 input format may require approximately 33 megabytes (MB) of data per frame. If the display device is being refreshed at 60 frames-per-second (FPS), this will result in 1.9 gigabytes of display data being communicated every second.

To reduce the bandwidth required by display data, lossless/lossy formats may be utilized to compress display data. One such compression format is universal bandwidth compression (UBWC) which compresses display data by spatially dividing the data into tiles. However, based on image content, each tile may have widely varying compression ratios.

Due to the rapid rate at which technology evolves, computing devices are increasingly dependent on real-time functionality of display devices. Thus, communication speed, data reliability, and power efficiency are particularly important in portable devices that are used in consumer computing devices. Accordingly, new and improved circuits, components, systems, and solutions that better meet these and other demands of modern and future computing devices will be beneficial to electronics and computer manufacturers, and their consumers.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some examples, the disclosure provides a method for bandwidth voting. The method includes, receiving, at a hardware voting component associated with a destination subsystem, metadata for each of a plurality of compressed display tiles, wherein for each of the plurality of compressed display tiles the metadata indicates an amount of compression of the compressed display tile. The method also includes, dividing the plurality of compressed display tiles into a plurality of sets of compressed display tiles. The method also includes, for each of the plurality of sets of compressed display tiles, determining a desired bandwidth for communicating the set of compressed display tiles over a bus based on the metadata corresponding to the set of compressed display tiles, and receiving the set of compressed display tiles at the destination subsystem over the bus at an actual bandwidth that is based on the desired bandwidth.

In some examples, the disclosure provides an apparatus for bandwidth voting. The apparatus includes a memory and a processor communicatively coupled to the memory. In some examples, the processor is configured to receive, at a hardware voting component associated with a destination subsystem, metadata for each of a plurality of compressed display tiles, wherein for each of the plurality of compressed display tiles the metadata indicates an amount of compression of the compressed display tile. In some examples, the processor is configured to divide the plurality of compressed display tiles into a plurality of sets of compressed display tiles. In some examples, for each of the plurality of sets of compressed display tiles, the processor is configured to determine a desired bandwidth for communicating the set of compressed display tiles over a bus based on the metadata corresponding to the set of compressed display tiles, and receive the set of compressed display tiles at the destination subsystem over the bus at an actual bandwidth that is based on the desired bandwidth.

In some examples, the disclosure provides for a non-transitory computer-readable storage medium that stores instructions that when executed by a processor of an apparatus, cause the apparatus to perform a method of radar detection. In some examples, the method includes receiving, at a hardware voting component associated with a destination subsystem, metadata for each of a plurality of compressed display tiles, wherein for each of the plurality of compressed display tiles the metadata indicates an amount of compression of the compressed display tile. In some examples, the method includes dividing the plurality of compressed display tiles into a plurality of sets of compressed display tiles. In some examples, for each of the plurality of sets of compressed display tiles, the method includes determining a desired bandwidth for communicating the set of compressed display tiles over a bus based on the metadata corresponding to the set of compressed display tiles, and receiving the set of compressed display tiles at the destination subsystem over the bus at an actual bandwidth that is based on the desired bandwidth.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Certain aspects of the present disclosure propose techniques for dynamically controlling bus bandwidth based on spatial compression properties of display data. For example, certain aspects relate to techniques for determining bandwidth according to a compression ratio of the display data, and requesting the determined bandwidth for communication of the display data through an interconnect or bus system. Accordingly, bandwidth of the bus system can be budgeted accurately and according to the needs of a display subsystem, resulting in reduced power consumption. Though certain aspects are discussed with respect to devices and systems for display and other graphics functions, it should be recognized that similar techniques may be applicable to other multimedia subsystems including audio systems, or other groups of systems that have similar data requirements. The various aspects discussed may be implemented in a wide variety of computing systems, including single processor systems, multiprocessor systems, multicore processor systems, system-on-a-chip (SoC), system in a package (SIP), or any combination thereof.

Figure 1:
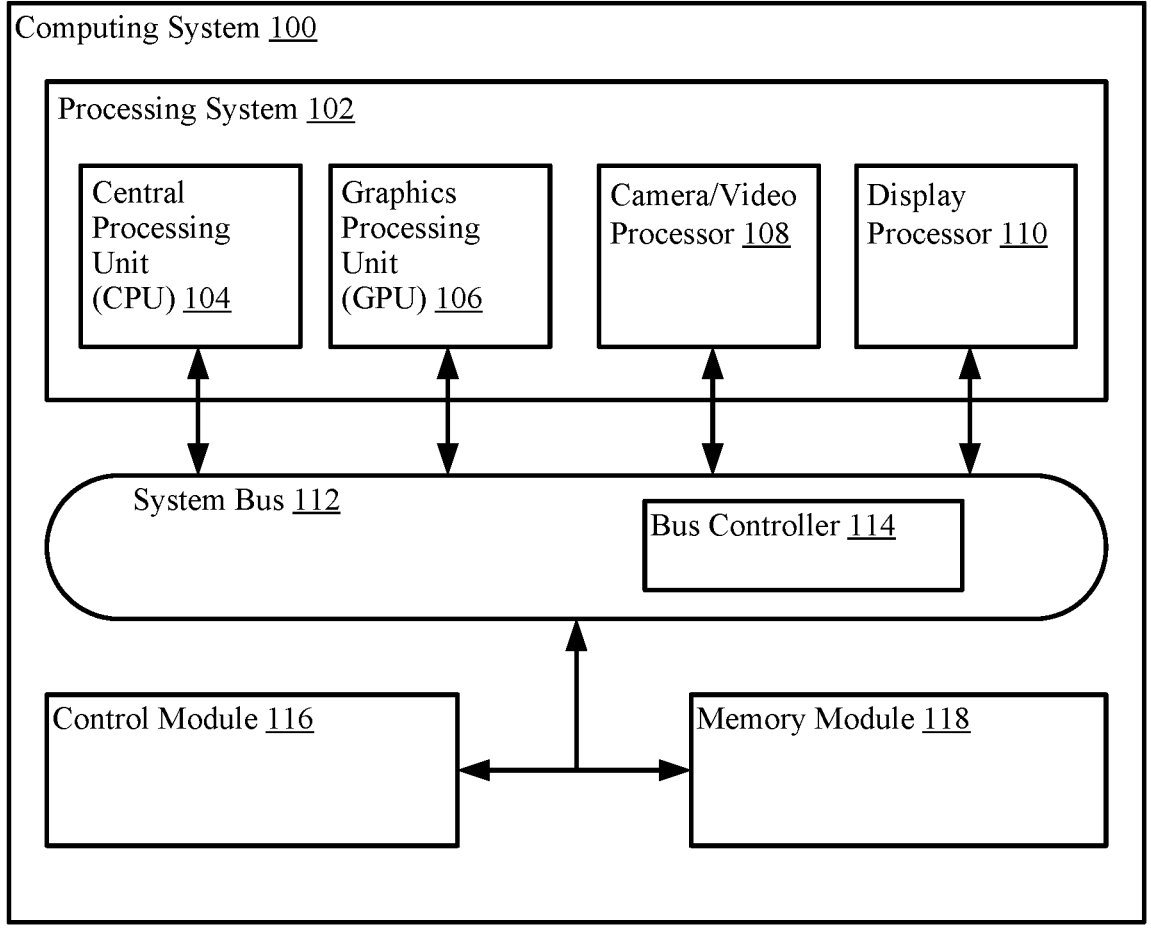
FIG. 1 is a block diagram of example subsystems and interconnections of a computing system suitable for implementing various aspects of the present disclosure.

FIG. 1 is a block diagram conceptually illustrating an example hardware implementation of a computing system 100 suitable for performing various aspects of the present disclosure. It should be noted that the computing system 100 described with respect to FIG. 1 is merely an example structure of a computing system, and any specific number of elements (e.g., modules, processors, hardware components, software components, etc.) may be omitted for a particular implementation. The computing system 100 may employ a processing system 102 that includes one or more processors configured to perform the various functions described throughout this disclosure. For example, the processing system 102, as utilized in the computing system 100, may be used to execute instructions stored on a computer-readable medium to implement any one or more of the processes described herein, for example, in FIG. 4.

The processing system 102 may include a number of heterogeneous processors, such as a central processing unit (CPU) 104, a graphics processing unit 106, a camera/video processor 108, and a display processor 110. Each processor (104, 106, 108, 110) may include one or more cores, and each processor/core may perform operations independent of the other processors/cores. Each processor (104, 106, 108, 110) may include part of a subsystem including one or more processors, caches, etc., configured to handle certain types of tasks or computations.

The processors 102, 104, 106, 108 may be interconnected to a control module 116, a memory module 118, and other system components via a system bus 112, which may include an array of reconfigurable logic gates and/or implement a bus architecture (e.g., CoreConnect, AMBA, etc.). The system bus 112 may include any number of interconnecting buses and bridges depending on the specific application of the various processors 102, 104, 106, 108, and overall design constraints. The system bus 112 may communicate between the various modules and circuit components utilizing advanced interconnects, such as high performance networks-on-chip (NoCs). One or more of the NoCs may be implemented as an asynchronous NoC or a synchronous NoC.

The system bus 112 may include or provide a bus controller 114 configured to grant the computing system 100 components (e.g., processors, peripherals, modules, subsystems, etc.) control of the bus (e.g., to communicate data) for a set duration, number of operations, number of bytes, etc. In one aspect, the bus controller 114 may enable processors and modules connected to the system bus 112 to operate as a master component and initiate and/or control memory transactions. The bus controller 114 may also be configured to implement an arbitration scheme to prevent multiple processors and/or modules from attempting to drive the bus simultaneously.

In some examples, the arbitration scheme includes executable instructions that enable and/or direct the bus controller 114 to receive bandwidth votes or "requests" for bandwidth (MB/s) needed from different clients (e.g., CPU 104, graphics processing unit (GPU) 106, camera/video processor 108, display processor 110, etc.). In one example, the bus controller 114 may aggregate bandwidth requests from multiple clients and determine a clock frequency needed for the aggregated requests. In some examples, the clock frequency is determined by computing a sum of the total bandwidth needed from the different clients, and dividing the sum by a number of bytes the memory (e.g., memory module 118) can transfer in 1 Hz. Accordingly, the bus controller 114 can modulate a clock rate of the system bus 112 (e.g., via a phase loop locking (PLL) sequence) to accommodate the multiple client bandwidth requests.

In some configurations, the memory module 118 may be coupled to or integrated (e.g., on the substrate, die, integrated chip, etc.) with the processing system 102. In other configurations, the memory module 118 may be external to the processing system 102, for example as a removable memory device or separate circuit. The memory module 118 may store instructions that are executable by a processor. To further illustrate, the memory 118 may include one or more memory devices such as: random access memory (RAM), dynamic RAM (DRAM), magneto-resistive RAM (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof.

In some aspects of the disclosure, the memory module 118 may include image compression instructions configured to cause the various processors 102, 104, 106, 108, to perform various operations related to compressing image data by spatially dividing images into tiles (e.g., universal bandwidth compression (UBWC)) as described herein. In some aspects of the disclosure, the memory module 118 may include processing instructions for performing various operations related to dynamically controlling bus bandwidth based on compression ratios of the image tiles. That is, such processing instructions may relate to time multiplexing, or arbitration, of display data communications on the system bus 112 as described herein.

The control module 116 may include one or more controllers configured to control or initiate operations between the memory module 118 and one or more processors (104, 106, 108, 110) of the processing system 102. In one example, the control module 116 may receive one or more instructions (e.g., commands) from a particular processor (104, 106, 108, 110), may issue sub-commands to subordinate modules or process tools, and may communicate status data back to the processor.

Figure 2:
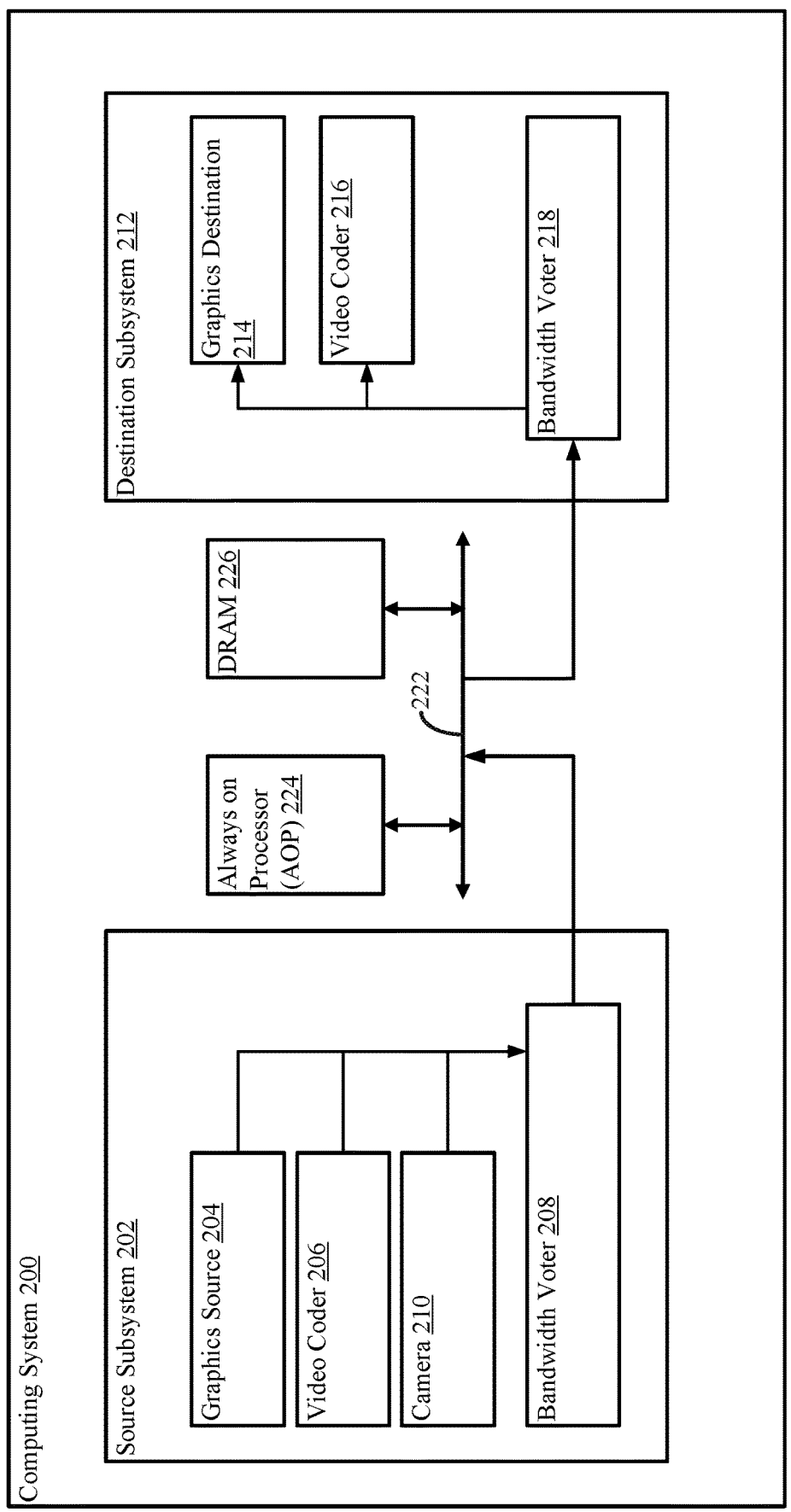
FIG. 2 is a block diagram conceptually illustrating an example of a hardware implementation for executing various aspects of a dynamic bandwidth voter, according to some aspects of the disclosure.

FIG. 2 is a block diagram conceptually illustrating an example hardware implementation of an exemplary computing system 200 employing a source subsystem 202 and a destination subsystem 212. In accordance with various aspects of the disclosure, an element (e.g., circuit components, interconnections, etc.), or any portion of an element, or any combination of elements may be implemented with a processing system (e.g., processing system 102 of FIG. 1) that includes one or more processors. For example, the source subsystem 202 and the destination subsystem 212 may be any suitable consumer and/or producer of display data, and in some examples, may be embodied by the CPU 104, GPU 106, camera/video processor 108, and/or display processor 110 of FIG. 1. It should be noted that the computing system 200 described with respect to FIG. 2 is merely an example of a design principle for a computing system, and any specific number of elements may be omitted for different implementations. Moreover, in some configurations, the source subsystem 202 may operate as a destination subsystem (e.g., operate as a consumer of display data), and the destination subsystem 212 may operate as a source subsystem (e.g., operate as a producer of display data).

In some aspects of the disclosure, the source subsystem 202 is coupled to the destination subsystem 212 via a system bus 222 (e.g., system bus 112 of FIG. 1). Similarly, the source subsystem 202 and the destination subsystem 212 are coupled to an always on processor (AOP) (e.g., bus controller 114 of FIG. 1) and a dynamic RAM (DRAM) device (e.g., a memory device of the memory module 118 of FIG. 1) through the system bus 222.

The source subsystem 202 may include a graphics source 204 configured to produce display data consumable by the destination subsystem 212. That is, in some aspects of the disclosure, the graphics source 204 is responsible for generating an image frame for display on a display device, such as a monitor. For example, the graphics source 204 may include a GPU processor configured to generate display frames for a 60 frame-per-second (FPS) game being executed by another processor on the computing system 200. In some examples, a camera 210 is configured to produce display data consumable by the destination subsystem 212.

The source subsystem 202 may also include a video coder 206. As used herein, the term "video coder" or "coder" refers generically to both video encoders and video decoders. In the embodiment of FIG. 2, the video coder 206 is configured to execute a compression algorithm, such as, for example, universal bandwidth compression (UBWC). Compression and/or decompression may be performed via UBWC. UBWC compresses display data produced by graphic sources, such as GPU, video, and/or camera. UBWC may work on a per-tile basis with a UBWC tile comprising a predetermined number of pixels (e.g., 4, 8, or more pixels). It should be appreciated that UBWC may increase the effective bandwidth of the system, reduce the power consumption for the memory subsystem, (e.g., DDR, memory controller, data path, etc.), and reduce the power consumption of various processors by making them run more efficiently and at lower voltage levels.

Similarly, the destination subsystem 212 may include a video coder 216. The video coder 216 is substantially similar to the video coder 206 of the source subsystem 202. That is, the video coder 216 of the destination subsystem 212 may be configured to execute the UBWC compression algorithm for compression and/or decompression of display data, in accordance with certain aspects of the disclosure.

The source subsystem 202 may also include a bandwidth voter 208 coupled to the system bus 222. In some examples, the bandwidth voter 218 includes a processor configured to execute a software algorithm stored on a computer-readable medium of the source subsystem 202 or in another location of the computing system 200. When executed, the software algorithm may cause the bandwidth voter 218 to request adjustment of the system bus 222 bandwidth based on various compression parameters. In one example, the bandwidth voter 218 communicates requests to the AOP 224 for adjustments to the system bus 222 bandwidth based on a compression ratio of one or more display tiles that have been compressed via the UBWC compression algorithm. In another example, the bandwidth voter 218 includes a register configured to partition a plurality of display tiles into sets of tiles (e.g., a slice of a frame) for communication over the system bus 222. That is, communication of the plurality of display tiles can be managed by communicating individual sets of tiles.

Similarly, the destination subsystem 212 may include a bandwidth voter 218. The bandwidth voter 218 is substantially similar to the bandwidth voter 208 of the source subsystem 202. That is, the bandwidth voter 218 of the destination subsystem 212 may include a hardware component and a software component configured to execute a software algorithm to cause the bandwidth voter to request adjustment of system bus 222 bandwidth based on various compression parameters, in accordance with certain aspects of the disclosure.

Example Operation of Dynamic Bandwidth Communication

In some configurations, the source subsystem 202 receives instruction from a controller (e.g., control module 116 of FIG. 1) to generate an image frame for display on a destination subsystem 212. The graphics source 204 generates the frame and communicates the frame to the video coder 206 which then compresses the frame using a UBWC compression algorithm. That is, the video coder 206 compresses the frame by spatially dividing the frame into a plurality of tiles, and compressing each tile to reduce the data size of the tile. It should be noted that content of the image may vary at each tile, resulting in inconsistent compression ratios between tiles of the same frame. For example, a first tile may have less inter- and/or inter-tile similarity than a second tile of the image, resulting in a lower compression ratio of the first tile relative to the second tile.

The video coder 206 may pass the compressed tiles through a bandwidth voter 208 to the system bus 222 for communication of the tiles to DRAM 226 for storage. In some examples, storage of the tiles in the DRAM 226 is accomplished by storing tile data and metadata. For example, the memory stores meta-data associated with the frame and/or one or more of the tiles. The meta-data may include information indicating an ordering of the tiles (e.g., sequential ordering) indicative of the spatial location of each tile in the frame, and information indicating an amount of compression for one or more tiles. The memory also stores the tile data.

In some examples, the destination subsystem 212 receives instructions from a controller (e.g., control module 116 of FIG. 1) to pull the tile stored on the DRAM 226 for decompression and reconstruction of the image for display on a graphics destination 214 (e.g., a monitor or screen).

Initially, the bandwidth voter 218 fetches metadata for each of a plurality of compressed display tiles from the DRAM 226. That is, the bandwidth voter receives metadata for a frame that includes a plurality of compressed tiles where, for each of the plurality of compressed tiles, the metadata indicates an amount of compression of the compressed display tile.

The bandwidth voter 218 also determines a vote latency associated with bandwidth control of the system bus 222. For example, the AOP 224 may control allocation of bandwidth of the system bus 222 to different subsystems based on votes (e.g., requests for a particular bandwidth) provided by those subsystems. In this example, the vote latency corresponds to a delay between the time a request for bandwidth is communicated from the bandwidth voter 218 to the time the AOP 224 is able to aggregate the bandwidth votes from the different subsystems, determine an actual bandwidth to be allocated to the bandwidth voter 218, and adjust the bandwidth of the system bus 222. Because the AOP 224 aggregates the bandwidth votes, the amount of bandwidth provided to each subsystem may not always be the same bandwidth that was requested by the subsystem.

Based on the metadata, the bandwidth voter 218 divides the plurality of compressed tiles into slices, or sets of display tiles, where each set contains a number of compressed tiles. In some configurations, the bandwidth voter 218 determines the size of the set (e.g., number of tiles in the set) based on the vote latency duration. For example, the bandwidth voter 218 may determine a number of tiles that can be communicated from the DRAM 226 to the bandwidth voter 218 over the duration of the latency. Once the number of tiles is determined, the bandwidth voter 218 may partition the plurality of tiles into sets having that number of tiles.

The bandwidth voter 218 then determines compression information of each of the tiles of a particular set. In one example, the bandwidth voter 218 fetches the compression information of the set of tiles from the metadata store on the DRAM 226. In another example, the bandwidth voter 218 retrieves compression information for every tile of the corresponding frame.

Based on the compression information of one or more tiles in the set of tiles, the bandwidth voter 218 will determine a desired bandwidth of the system bus 222 for communicating the set of tiles from the DRAM 226 to the bandwidth voter 218. In some configurations, the bandwidth voter 218 will determine compression information (e.g., a compression ratio) of the tile in the set of tiles having the least amount of compression. That is, of the tiles in the set, the bandwidth voter 218 will determine which tile or tiles were compressed the least from their original size. The bandwidth voter 218 then uses the compression information to determine the desired system bus 222 bandwidth for communicating the set of tiles from the DRAM 226 to the bandwidth voter 218 within the duration of the voter latency.

The bandwidth voter 218 then transmits a request for the desired bandwidth to the AOP 224, which determines the actual system bus 222 bandwidth that will be used for communicating the corresponding set of tiles from the DRAM 226 to the bandwidth voter 218. As noted above, the actual bandwidth is determined by the AOP 224 based on an aggregation of requests for bandwidth from other systems. Thus, while the actual bandwidth allocated to the bandwidth voter 218 is based on the desired bandwidth, the actual bandwidth may not be equal to the desired bandwidth.

Figure 3:
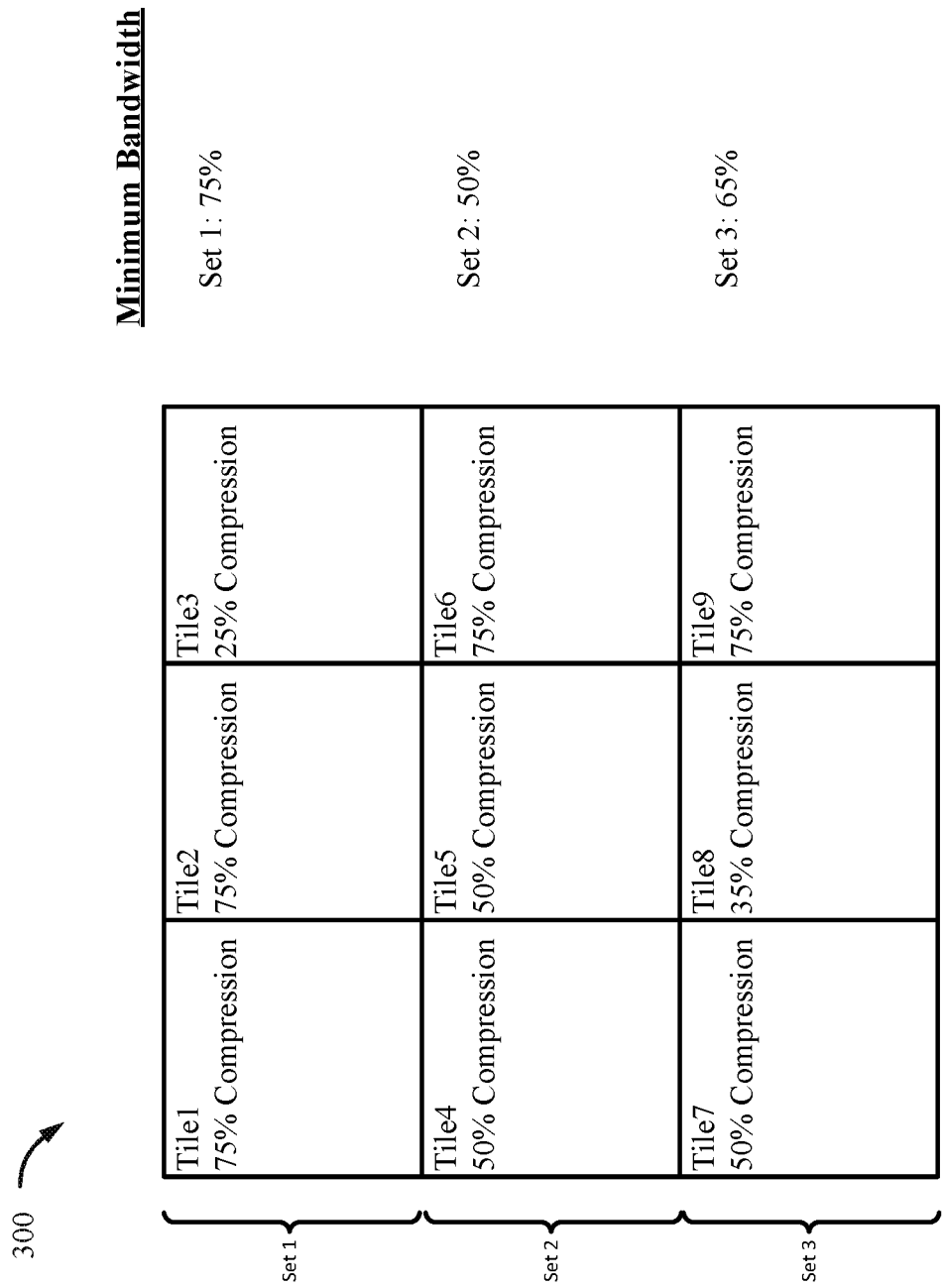
FIG. 3 is a block diagram conceptually illustrating an example of a plurality of image tiles divided into sets, according to some aspects of the disclosure.

FIG. 3 is a conceptual block diagram illustrating an example of compressed frame 300 composed of nine tiles compressed at different compression ratios, with each row of three tiles corresponding to a set of tiles. For example, the top row corresponds to Set 1, the middle row corresponds to Set 2, and the bottom row corresponds to Set 3.

Set 1 of the frame 300 includes tile1 having 75% compression, tile2 having 75% compression, and tile3 having 25% compression. That is, the display data of tile1 and tile2 have been compressed to 25% of their original size, and the display data of tile3 has been compressed to 75% of its original size. Thus, in Set 1, tile3 has been compressed the least, and will form the basis for determining a desired bandwidth for communicating Set 1. Set 2 of the frame 300 includes tile4 having 50% compression, tile5 having 50% compression, and tile6 having 75% compression. In other words, the display data of tile4 and tile5 have been compressed to 50% of their original size, and the display data of tile6 has been compressed to 25% of its original size. Thus, in Set 2, tile4 and tile5 have been compressed the least, and will form the basis for determining a desired bandwidth for communicating Set 2. Similarly, the bottom row of the frame 300 includes tile? having 50% compression, tile8 having 35% compression, and tile9 having 75% compression. That is, the display data of tile7 has been compressed to 50% of its original size, the display data of tile8 has been compressed to 65% of its original size, and the display data of tile9 has been compressed to 25% of its original size. Thus, tile8 is the least compressed tile of Set 3, and will form the basis for determining a desired bandwidth for communicating Set 3.

In some configurations, the bandwidth voter 218 determines the compression information of tiles in a set of tiles in a sequential order of sets. For example, the bandwidth voter 218 may determine the bandwidth for communication of the tiles of Set 1 based on the compression information of tile1, tile2, and tile3, before it determines a bandwidth to accommodate communication of the tiles in Set 2.

In some configurations, the bandwidth voter 218 may determine that, of the distribution of compression ratios among the tiles of Set 1, tile3 has been compressed the least. On this basis, the bandwidth voter 218 may determine a first bandwidth for communication of all the tiles of Set 1 within the voting latency duration based on the compression ratio of tile3. That is, the bandwidth voter 218 determines the first bandwidth based on the assumption that all the tiles in Set 1 have the same compression ratio as tile3. Referring now to Set 2, the bandwidth voter 218 determines that tile4 and tile5 have been compressed the least. Accordingly, bandwidth voter 218 may determine a second bandwidth for communication of all the tiles of Set 2 within the voting latency duration based on the compression ratio of tile4 and tile5. The process may be repeated for each remaining set of tiles in a frame. By using a tile having the least amount of compression in the set of tiles to determine the system bus 222 bandwidth for communication of a set of tiles, the bandwidth voter 218 is able to ensure that communication of the set of tiles does not exceed the voting latency duration. That is, even if the actual system bus 222 bandwidth provided by the AOP 224 is less than the desired bandwidth request by the bandwidth voter 218, variations in tile compression ratios within the set (e.g., some tiles being more compressed than the tile used to determine bandwidth) prevent communication of the set of tiles from exceeding the voting latency duration.

In another example, the bandwidth voter 218 may determine a system bus 222 bandwidth based on compression distribution of all the tiles in a set. Referring to Set 1, the bandwidth voter 218 may determine, from meta-data of the frame 300, compression information for tile1, tile2, and tile3. In this example, the bandwidth voter 218 may determine a first desired bandwidth for communication of Set 1 within the voting latency duration based on the compression of all the tiles in Set 1 instead of just the least compressed tile. The process may be repeated for each remaining set of tiles in a frame. The advantage of this example relates to a reduction of bandwidth required for the communication of all the tiles in a set by taking into account the varying compression ratios of the set of tiles. That is, less power is used for communication of the sets and bus bandwidth is conserved. This example may be most advantageous in computer systems with other clients/subsystems that produce data relatively smaller in size (e.g., graphics source 204 data is generally larger than audio data), allowing the AOP 224 to provide bandwidth voter 218 with the bandwidth requested.

In some configurations, the desired bandwidth is equal to the amount of uncompressed data in the least compressed tile. For example, for Set 1, the least compressed tile is tile3 which is 25% compressed. Accordingly, the bandwidth voter 218 may determine that the desired bandwidth for communicating Set 1 over the system bus 222 is 75% of the entire system bus 222 bandwidth. In other configurations, the desired bandwidth is calculated using an algorithm that takes into account the compression ratio of one or more tiles in each set of tiles, the number of other subsystems using the system bus 222, the type of data communicated over the system bus 222 by the number of other subsystems, and the total bandwidth of the system bus 222. The algorithm may also consider data priority, data reliability, and quality of service (QoS) requirements associated with the data.

Once the bandwidth voter 218 determines a desired bandwidth for communication of the tiles in Set 1, the bandwidth voter 218 generates and communicates a request for the desired bandwidth to the AOP 224. The AOP 224 may increase or decrease the clock rate of the system bus 222 to accommodate an actual bandwidth determined based on the requested bandwidth. That is, the AOP 224 is configured to modulate the system bus 222 bandwidth based on the request so that the tiles of Set 1 can be communicated from the DRAM 226 to the bandwidth voter 218 of the destination subsystem 212 within the voting latency duration of Set 1.

Once the graphics destination 214 begins pulling the tiles of Set 1 from the DRAM 226, and upon initial receipt of data corresponding to the tiles of Set 1 by the bandwidth voter 218, the bandwidth voter 218 may begin to determine compression information corresponding to tiles in Set 2 and a second desired bandwidth for communication of Set 2 tiles over the system bus 222. In some configurations, the bandwidth voter 218 may begin to determine compression information corresponding to tiles in Set 2 upon receipt of a first bit of data of tile1.

In some configurations, the bandwidth voter 218 will determine whether the second desired bandwidth increased relative to the first desired bandwidth. For example, once the second desired bandwidth for communication of Set 2 is determined, the bandwidth voter 218 may compare the first desired bandwidth and the second desired bandwidth.

If the second desired bandwidth increased relative to the first desired bandwidth, then the bandwidth voter 218 can proceed to communicate a request for the second desired bandwidth to the AOP 224 before the bandwidth voter 218 receives all the tiles of Set 1.

If, however, the second desired bandwidth decreased relative to the first desired bandwidth, then the bandwidth voter 218 may wait for receipt of all the tiles of Set 1 before communicating a request for the second bandwidth to the AOP 224. In this example, the bandwidth voter 218 may wait before communicating the request for the second bandwidth because if the AOP 224 reduces the bandwidth too soon, the reduced bandwidth will affect the communication of Set 1 tiles.

Figure 4:
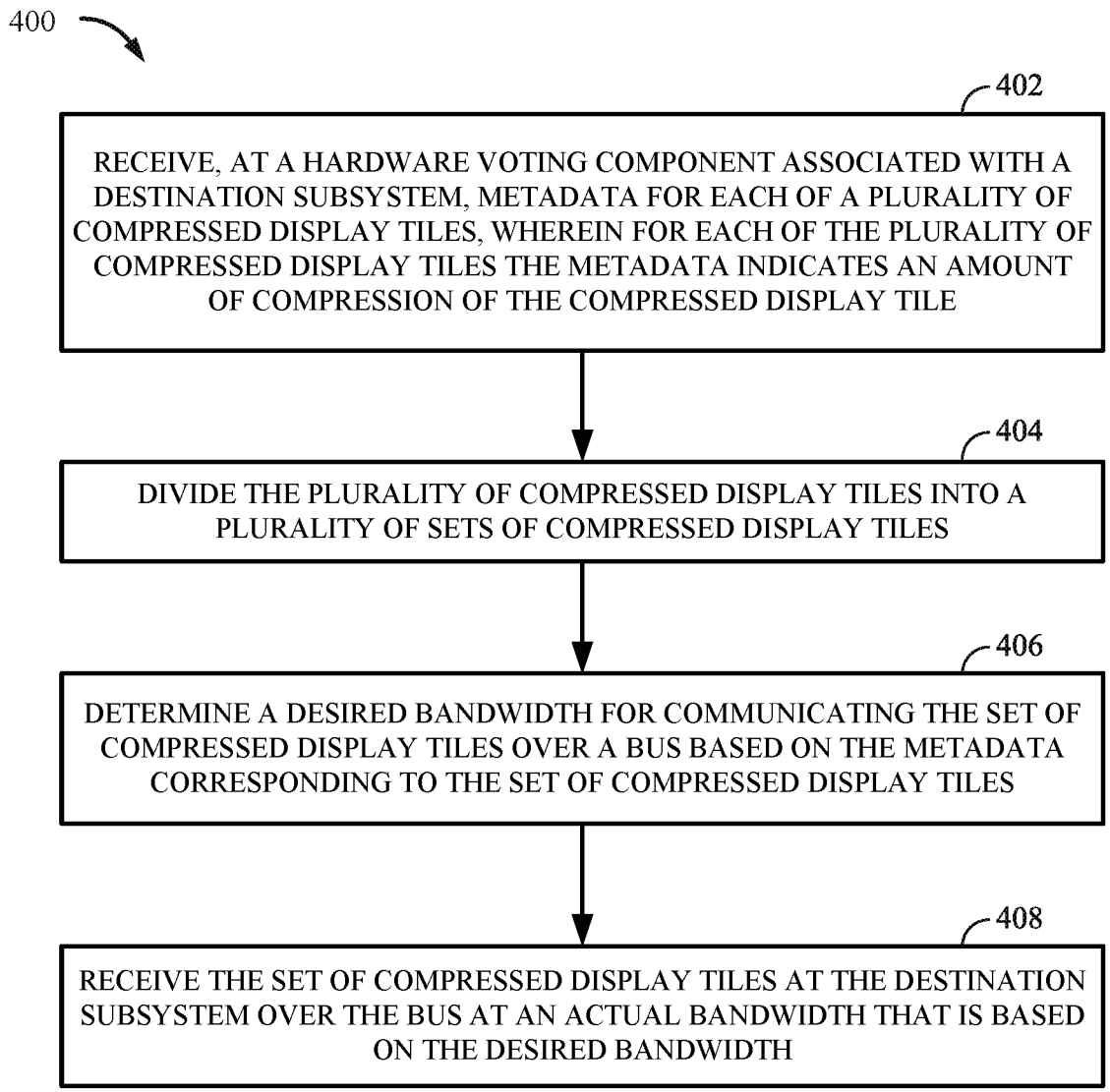
FIG. 4 is a flow chart illustrating an exemplary process for executing various aspects of the dynamic bandwidth voter, according to some aspects of the disclosure.

FIG. 4 is a flow chart illustrating an exemplary process 400 for managing QoS in a data network. In some examples, the process 400 may be implemented by any of the computing systems described above and illustrated in FIGS. 1 and 2. In other examples, the process 400 may be implemented by any suitable apparatus or means for carrying out the described functions.

At block 402, the process 400 starts by receiving, at a hardware voting component associated with a destination subsystem, metadata for each of a plurality of compressed display tiles, wherein for each of the plurality of compressed display tiles the metadata indicates an amount of compression of the compressed display tile.

At block 404, the process 400 proceeds by dividing the plurality of compressed display tiles into a plurality of sets of compressed display tiles. In some configurations, the plurality of compressed display tiles are divided into a plurality of sets of compressed display tiles based on a latency between transmitting the request and determining, by a controller (e.g., AOP 224), the actual bandwidth based on the desired bandwidth. In some configurations, the process 400 determines a number of tiles in each of the plurality of sets of compressed display tiles based on the latency.

At block 406, the process 400 proceeds by determining a desired bandwidth for communicating the set of compressed display tiles over a bus based on the metadata corresponding to the set of compressed display tiles. In some configurations, determining the desired bandwidth for communicating the set of compressed display tiles over the bus is based on the amount of compression of at least one compressed display tile of the set of compressed display tiles that is least compressed in the set.

At block 408, the process 400 proceeds by receiving the set of compressed display tiles at the destination subsystem over the bus at an actual bandwidth that is based on the desired bandwidth.

In some configurations, the process 400 may also include transmitting, for each of the plurality of sets of compressed display tiles, a request for the desired bandwidth on the system bus 222 to the controller. The controller may then determine the actual bandwidth based on the desired bandwidth. As noted previously, the controller may receive a plurality of requests for bandwidth from other subsystems, and determine an actual bandwidth based on the plurality of requests. In some examples, the controller aggregates the plurality of requests and allocates system bus 222 bandwidth accordingly.

In some configurations, the process 400 may also include receiving a first set of compressed display tiles at the destination subsystem over the bus at a first actual bandwidth that is based on a first desired bandwidth, and determining a second desired bandwidth for communicating a second set of compressed display tiles over the bus. In this configuration, the process 400 may also include determining whether the second desired bandwidth is greater-than or less-than the first actual bandwidth. If the second desired bandwidth is greater-than the first actual bandwidth, the process 400 may include transmitting a request for the second desired bandwidth to a controller upon receipt of a first tile of the first set of compressed display tiles. If the second desired bandwidth is less-than the first actual bandwidth, the process 400 may include transmitting a request for the second bandwidth to a controller after receipt of all display tiles in the first set of compressed display tiles.

Additional Considerations

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method for bandwidth voting, comprising:
receiving, at a hardware voting component associated with a destination subsystem, metadata for each of a plurality of compressed display tiles, wherein for each of the plurality of compressed display tiles the metadata indicates an amount of compression of the compressed display tile;
dividing the plurality of compressed display tiles into a plurality of sets of compressed display tiles;
for each of the plurality of sets of compressed display tiles:
determining a desired bandwidth for communicating the set of compressed display tiles over a bus based on the metadata corresponding to the set of compressed display tiles; and
receiving the set of compressed display tiles at the destination subsystem over the bus at an actual bandwidth that is based on the desired bandwidth;
the plurality of sets of compressed display tiles comprising a first set of compressed display tiles received at the destination subsystem over the bus at a first actual bandwidth that is based on a first desired bandwidth;
determining whether a second desired bandwidth is not equal to the first actual bandwidth, the second desired bandwidth for communicating a second set of compressed display tiles of the plurality of sets of compressed display tiles over the bus;
if the second desired bandwidth is greater than the first actual bandwidth, transmitting a request for the second desired bandwidth to a controller upon receipt of a first tile of the first set of compressed display tiles; and
if the second desired bandwidth is less than the first actual bandwidth, transmitting a request for the second desired bandwidth to the controller after receipt of all display tiles in the first set of compressed display tiles.

2. The method of claim 1, further comprising, for each of the plurality of sets of compressed display tiles:
transmitting a request for the desired bandwidth to a controller; and
determining, by the controller, the actual bandwidth based on the desired bandwidth.

3. The method of claim 2, further comprising:
receiving, at the controller, a plurality of requests for bandwidth, wherein the actual bandwidth is determined further based on the plurality of requests for bandwidth.

4. The method of claim 2, wherein dividing the plurality of compressed display tiles into the plurality of sets of compressed display tiles is based on a latency between transmitting the request and determining, by the controller, the actual bandwidth based on the desired bandwidth.

5. The method of claim 4, further comprising determining a number of tiles in each of the plurality of sets of compressed display tiles based on the latency.

6. The method of claim 1, wherein determining the desired bandwidth for communicating the set of compressed display tiles over the bus based on the metadata corresponding to the set of compressed display tiles comprises determining the desired bandwidth based on the amount of compression of the compressed display tile of the set of compressed display tiles that is least compressed.

7. An apparatus for bandwidth voting, comprising:
a memory; and
a processor communicatively coupled to the memory, wherein the processor is configured to:
receive, at a hardware voting component associated with a destination subsystem, metadata for each of a plurality of compressed display tiles, wherein for each of the plurality of compressed display tiles the metadata indicates an amount of compression of the compressed display tile;
divide the plurality of compressed display tiles into a plurality of sets of compressed display tiles;
for each of the plurality of sets of compressed display tiles:
determine a desired bandwidth for communicating the set of compressed display tiles over a bus based on the metadata corresponding to the set of compressed display tiles; and
receive the set of compressed display tiles at the destination subsystem over the bus at an actual bandwidth that is based on the desired bandwidth;
the plurality of sets of compressed display tiles comprising a first set of compressed display tiles received at the destination subsystem over the bus at a first actual bandwidth that is based on a first desired bandwidth;
determine whether a second desired bandwidth is not equal to the first actual bandwidth, the second desired bandwidth for communicating a second set of compressed display tiles of the plurality of sets of compressed display tiles over the bus;
if the second desired bandwidth is greater than the first actual bandwidth, transmit a request for the second desired bandwidth to a controller upon receipt of a first tile of the first set of compressed display tiles; and
if the second desired bandwidth is less than the first actual bandwidth, transmit a request for the second desired bandwidth to the controller after receipt of all display tiles in the first set of compressed display tiles.

8. The apparatus of claim 7, wherein, for each of the plurality of sets of compressed display tiles, the processor is further configured to:
transmit a request for the desired bandwidth to a controller; and
determine, by the controller, the actual bandwidth based on the desired bandwidth.

9. The apparatus of claim 8, wherein the processor is further configured to receive a plurality of requests for bandwidth, wherein the actual bandwidth is determined further based on the plurality of requests for bandwidth.

10. The apparatus of claim 8, wherein the processor is further configured to:
   divide the plurality of compressed display tiles into the plurality of sets of compressed display tiles based on a latency between transmitting the request and determining the actual bandwidth based on the desired bandwidth.

11. The apparatus of claim 10, wherein the processor is further configured to determine a number of tiles in each of the plurality of sets of compressed display tiles based on the latency.

12. The apparatus of claim 7, wherein the processor, being configured to determine the desired bandwidth for communicating the set of compressed display tiles over the bus based on the metadata corresponding to the set of compressed display tiles, is further configured to:
   determine the desired bandwidth based on the amount of compression of the compressed display tile of the set of compressed display tiles that is least compressed.

13. A non-transitory computer-readable storage medium that stores instructions that when executed by a processor of an apparatus cause the apparatus to perform a method of radar detection comprising:
   receiving, at a hardware voting component associated with a destination subsystem, metadata for each of a plurality of compressed display tiles, wherein for each of the plurality of compressed display tiles the metadata indicates an amount of compression of the compressed display tile;
   dividing the plurality of compressed display tiles into a plurality of sets of compressed display tiles; and
   for each of the plurality of sets of compressed display tiles:
      determining a desired bandwidth for communicating the set of compressed display tiles over a bus based on the metadata corresponding to the set of compressed display tiles; and
      receiving the set of compressed display tiles at the destination subsystem over the bus at an actual bandwidth that is based on the desired bandwidth;
   the plurality of sets of compressed display tiles comprising a first set of compressed display tiles received at the destination subsystem over the bus at a first actual bandwidth that is based on a first desired bandwidth;
   determining whether a second desired bandwidth is not equal to the first actual bandwidth, the second desired bandwidth for communicating a second set of compressed display tiles of the plurality of sets of compressed display tiles over the bus;
   if the second desired bandwidth is greater than the first actual bandwidth, transmitting a request for the second desired bandwidth to a controller upon receipt of a first tile of the first set of compressed display tiles; and
   if the second desired bandwidth is less than the first actual bandwidth, transmitting a request for the second desired bandwidth to the controller after receipt of all display tiles in the first set of compressed display tiles.

14. The non-transitory computer-readable storage medium of claim 13, wherein the method further comprises, for each of the plurality of sets of compressed display tiles:
   transmitting a request for the desired bandwidth to a controller; and
   determining, by the controller, the actual bandwidth based on the desired bandwidth.

* * * * *